United States Patent [19]
Reneau

[11] Patent Number: 4,632,432
[45] Date of Patent: Dec. 30, 1986

[54] REMOTE BALL CONNECTOR

[75] Inventor: Bobby J. Reneau, Houston, Tex.

[73] Assignee: Gripper, Inc., Houston, Tex.

[21] Appl. No.: 608,384

[22] Filed: May 9, 1984

[51] Int. Cl.⁴ ............................................. F16L 27/04
[52] U.S. Cl. ..................................... 285/24; 285/263;
 285/315; 285/313; 285/920; 285/81; 285/261
[58] Field of Search ................ 285/24, 86, 261, 263,
 285/309, 310, 313, 315, 312, 420, 320, DIG. 21,
 18, 27, 81; 166/338, 341, 342, 343; 244/135

[56] References Cited
U.S. PATENT DOCUMENTS

| 2,199,588 | 5/1940 | Cobham et al. | 285/DIG. 21 |
|---|---|---|---|
| 3,450,421 | 6/1969 | Harwell | 285/24 |
| 3,695,633 | 10/1972 | Hanes | 285/DIG. 21 |
| 3,874,706 | 4/1975 | Arnold | 285/24 |
| 3,997,197 | 12/1976 | Marsh et al. | 285/261 |
| 4,139,221 | 2/1979 | Shotbolt | 285/DIG. 21 |
| 4,180,285 | 12/1979 | Reneau | 285/261 |
| 4,191,256 | 3/1980 | Croy et al. | 166/343 |

FOREIGN PATENT DOCUMENTS 223344 5/1958 Australia ................... 285/DIG. 21

OTHER PUBLICATIONS

Pages 8 & 9 of Gripper, Inc. Brochure.

Primary Examiner—Cornelius J. Husar
Assistant Examiner—Eric K. Nicholson
Attorney, Agent, or Firm—Pravel, Gambrell, Hewitt & Kimball

[57] ABSTRACT

An apparatus for connecting together a ball and a cup wherein the ball has mounted thereover a hydraulic flange assembly which includes extendable guide arms which extend outwardly for initial centering of the ball in alignment with the cup and includes a mechanism for pulling the ball into the cup. After the ball is fully aligned within the cup, radial latching segments move down and finally latch the ball and cup together. The entire apparatus is hydraulically operated such that it may be used for diverless connections of flowline portions together.

18 Claims, 3 Drawing Figures

REMOTE BALL CONNECTOR

TECHNICAL FIELD OF THE INVENTION

This invention relates to apparatus for connecting together first and second flowline members remotely. For example, the apparatus for this invention may be used to connect together first and second flowline members at extensive underwater depths utilizing a remotely operable power vehicle.

BACKGROUND OF THE INVENTION

A search for oil offshore has moved drilling activity further and further out to sea into deeper and deeper water. Activities are now being carried on, such as the placement of pipeline risers and pipeline repairs at depths which exceed the safe level of operation of divers. In order to operate at such extensive depths, the utilization of a Remote Operated Vehicle (ROV) has become more and more common. An ROV is a propeller driven, fully remotely operable underwater vehicle utilizing TV cameras for eyes and having gripping arms and hydraulic power connections. The ROV can be completely controlled from a surface vessel and thus offers the tremendous advantage of avoiding the endangerment of human life. Of course, as the use of the ROV has increased, the need for adapting previous diver type functions to diverless functions has grown. One area now in need of diverless operation is the repair and connection of oil and gas pipelines at extensive depths.

In the past, the repair of pipelines has been a diver task. One known type of repair utilizing divers includes the preparation of a repair spool on a ship, perhaps including a pipe length compensator, with the repair spool having end connections which use pivotal ball flange connectors which are known in the art. The advantage of such pivotal ball connectors is the allowance of the connection of the repair spool such as between the ends of a resected pipeline without requiring exact alignment.

One attempt to design a diverless underwater connector for use at extensive water depth in U.S. Pat. No. 4,180,285 of the same inventor herein and entitled Articulated Ball Connector For Use With Pipeline. In U.S. Pat. No. 4,180,285 the male member of the connector includes a movable collar mounted over the spherical male end; the collar is movable to various positions by utilization of hydraulic cylinders. In this manner, the movable collar may be aligned with the female end of the connector attached to the other flowline and thereafter a hydraulic locking connection is made utilizing an axially movable wedge which moves against a locking ring.

In spite of the teachings of this patent and other attempts, the problems of making initial contact between a repair spool and at least one end of the flowline being repaired or otherwise connected to is believed to still exist. For example, the problem of alignment utilizing remote control mechanisms is one area that continues to need improvement. Therefore, it is believed that the search for a workable, fully alignable and lockable diverless connector has continued.

SUMMARY OF THE INVENTION

It is an object of this invention to provide a new and improved remote ball connector which may be utilized at sea depths beyond the capacity for diver operation and which may be connected together utilizing remote control apparatus such as a ROV. It is a further object of this invention to provide a new and improved diverless remote ball connector which provides a superior mechanism for initial and final alignment and locking in place. These objects and other objects of this invention are accomplished by the apparatus of this invention for connecting together first and second flowline members. Such apparatus includes a female member adapted to be connected to a first flowline and a male member adapted to be connected to a second flowline. The male member includes a ball portion having an exterior convex configuration of a sphere and the female member includes an internal, concave portion partly in the configuration of a sphere and being adapted to receive the ball portion of the male member therein. The male member has mounted thereon a hydraulic flange assembly. Guide means are mounted with the hydraulic flange assembly for guiding the hydraulic flange assembly and the male member into a position of initial alignment with the female member. The guide means further includes alignment means for pulling the male and female members together and into further alignment such that the ball Bember is positioned within the female or cup member. A final locking means is mounted with the hydraulic flange assembly and forms a part thereof and is hydraulically actuatable for movement into locking engagement with the female member.

This description is merely a summary of this invention and therefore it is not intended that this summary include all patentable features of the invention, which are set forth in the Description of the Preferred Embodiment and the Claims to follow.

DESCRIPTION OF THE PREFERRED EMBODIMENT

Figure 1:
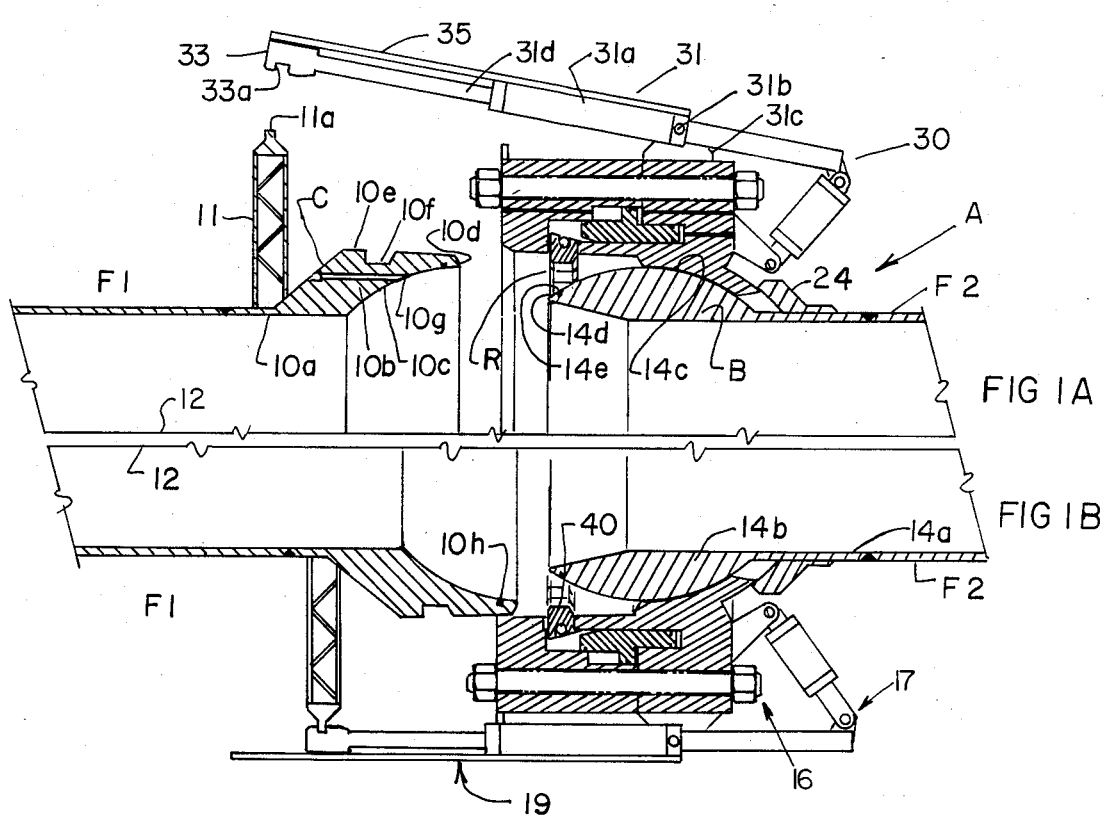
FIG. 1A is a sectional view taken through a plane intersecting the longitudinal axis of the apparatus of this invention and illustrates the ball and cup members in a position prior to initial alignment.
FIG. 1B is a sectional view similar to FIG. 1A illustrating the engagement by the guide means of the ball member with the female member so that the male and female members can be pulled together.

Referring to the drawings, the letter A generally designates the apparatus of this invention for connecting together a first flowline member F-1 and a second flowline member F-2. The flowline member F-1 terminates in the female member or cup C and the flowline F-2 terminates in a male member or ball B.

The cup C is a generally cylindrical member which includes a cylindrical pipe portion 10a and a female end portion 10b which has an interior, convex surface 10c in the configuration of a spherical section. The female end portion 10b terminates in a camming or leading inclined frusto-conical annular surface 10d. The female end portion 10b includes an outer cylindrical surface 10e having a cylindrical groove 10f therein. The cylindrical groove includes opposing converging inclined walls and a flat bottom. The female end portion further includes a test bore 10g which is machined into and through the female end portion 10b so that fluid under pressure may be directed into the connected joint to test the seal. The female end portion 10b further includes a groove and o-ring combination 10h near to the camming end surface 10d for sealingly engaging the male member B when the cup and ball B are locked together.

The cup C further includes an attachment disc 11 which is mounted onto the cylindrical section 10a in a plane transverse to the longitudinal axis 12 of the cup and flowline member F-1. The attachment member or structure 11 may be solid or hollow as it is illustrated in the drawings. The attachment disc 11 is an annular member which is mounted over the cylindrical section 10a and welded or otherwise attached thereto. The attachment disc 11 includes a cylindrical gripping edge or attachment rim 11a which is positioned at the outer edge of the attachment disc 11 and is thus radially displaced from the cup C.

The male member or ball B is welded or otherwise attached to the flowline F-2, which may be a replacement spool or other flowline section which is being connected between the flowline F-1 and another flowline (not shown). The ball B includes a generally cylindrical portion 14a which is welded to flowline F-2 and a male end portion 14b formed integrally therewith. The male end portion 14b includes an exterior, convex spherical surface portion 14c which is adapted to sealingly engage the complementary female, spherical surface section 10c on the cup C. The end or nose 14d of the spherical surface 14c is a slightly oversized radius to form an interference fit with the interior, spherical surface 10c of the cup C when the members C and B are locked together. A groove 14e is machined into the end 14d in order to provide a better metal-to-metal seal between the cup C and the ball or member B when in the locked position of FIG. 2.

A hydraulic flange assembly generally designated as 16 is mounted onto the male member B for attachment to the attachment disc 11 on the female member or cup C, for bringing the male member B and the cup C into initial and final alignment and for locking the two members together. The hydraulic flange assembly 16 is operable by the application of hydraulic fluid under pressure, which may be supplied remotely such as through a Remote Operated Vehicle or ROV.

Guide means generally designated as 17 are mounted with the hydraulic flange assembly 16 and is provided for guiding the hydraulic flange assembly 16 and the male member B mounted therewith into a position of initial alignment with the cup C. The guide means 17 further includes alignment means 19 mounted with the hydraulic flange assembly 16 and cup C for pulling the male member or ball B into the cup C into a position of final alignment. The hydraulic flange assembly 16 further includes a final locking means generally designated as 20 mounted with the hydraulic flange assembly 16 for moving from the hydraulic flange assembly into a locked position with the cup C.

The hydraulic flange assembly 16 includes first and second generally cylindrical body members 21 and 22. The body member 21 includes an internal, concave, spherical surface 21a which mounts the entire assembly over the male member B for limited movement with respect thereto. The body member 21 further includes a spherical rim section 21b which is mounted in an annular groove 23 formed between the exterior spherical surface 14c of the male member and a mounting ring 24. The mounting ring 24 is mounted onto the cylindrical section 14a of the male member and includes an interior, inclined surface 24a which cooperates with the exterior surface 14c of the male member to provide the groove 23 into which the rim 21b fits. In this manner, the body member 21 as well as the body member 22 which form the hydraulic flange assembly 21 is mounted for limited movement over the exterior, spherical surface of the male member B to cooperate with and form a part of the guide means 17 to align the cup C and the male member or ball B.

The second body member 22 of the hydraulic flange assembly is also generally cylindrical and is adapted to fit against and cooperate with the first body member 21. The body members 21 and 22 include a series of circumferentially spaced aligned bores 21c and 22c which receive mounting bolts and nuts 25 which mount the body members together. The body members 21 and 22 cooperate to form a first annular bore 26a and a second annular bore 26b which is positioned radially outside of but in fluid communication with the first bore 26a. The first and second bores 26a and 26b form part of the final locking means 20 to be further described hereinafter. The body members 21 and 22 further include a circumferential slot or groove 27 which is open to the first and second bores 26a and 26b. The circumferential slot 27 also forms part of the final locking means 20.

The body members 21 and 22 cooperate to provide a cylindrical internal cylindrical surface 28 on either side of the cylindrical slot or groove 27 which has a diameter slightly greater than the outside diameter of the cylindrical outside surface 10e of the cup C. In this manner, the cup C can be moved into the generally cylindrical space or receiving area R between the internal cylindrical surface 28 of the hydraulic flange assembly 16, which is formed by the body members 21 and 22, and the exterior spherical surface 14c of the ball B.

The guide means generally designated as 17 includes alignment means 19 comprising a plurality of hydraulic cylinder assembly sets each of which is designated generally by the number 30. Each hydraulic cylinder set 30 includes a first hydraulic cylinder assembly 31 and a second hydraulic cylinder assembly 32. The hydraulic cylinder assemblies 31 and 32 cooperate to guide the hydraulic flange assembly 16 and the male member B attached thereto into a position of initial and then final alignment with the cup C. Preferably, the number of hydraulic cylindrical sets is three but it should be understood that the number may be varied depending upon the size of the apparatus.

Each of the first and second hydraulic cylinder assemblies 31 and 32 form a guide arm assembly and alignment means 19 mounted with the hydraulic flange assembly 16 for the purpose of providing the initial alignment between the cup C and male member B and for thereafter pulling the male member and hydraulic flange assembly 16 toward the cup C so that the cup C can move between the internal cylindrical surface 28a and the exterior spherical surface 14c of the male member, which is the receiving area R.

The first hydraulic cylinder assembly 31 of each of the guide arm assemblies includes a hydraulic cylinder 31a mounted by a pin 31b extending through lugs 31c for pivotal movable with respect to the hydraulic flange assembly body members 21 and 22. The lugs 31c are welded onto and extend radially outwardly from the body member 21. The first hydraulic cylinder assembly 31 is movable between the inward position of FIG. 1B and the outward position of FIG. 1A by means of the second hydraulic cylinder assembly 32. The first hydraulic cylinder 31a has mounted therein a rod 31d which is attached to a piston (not shown) in the usual manner such that the introduction of hydraulic fluid under pressure into the cylinder 31 moves the rod 31d between the extended position of FIG. 1A and the retracted position of FIG. 2. The rod 31d terminates in an attachment head 33 which includes an internal gripping or attachment groove 33a which is sized to fit over the attachment rim 11a of the disc 11 mounted on the female member C. Additionally, a guide bar 35 is welded onto the hydraulic cylinder 31a and extends outwardly slightly beyond the extended position of the rod 31d to cooperate with the rod 31d in centering the hydraulic flange assembly 16 and the male member B. While the guide bar is not illustrated in cross-section, it is approximately the width of the attachment or gripping head 33.

Figure 2:
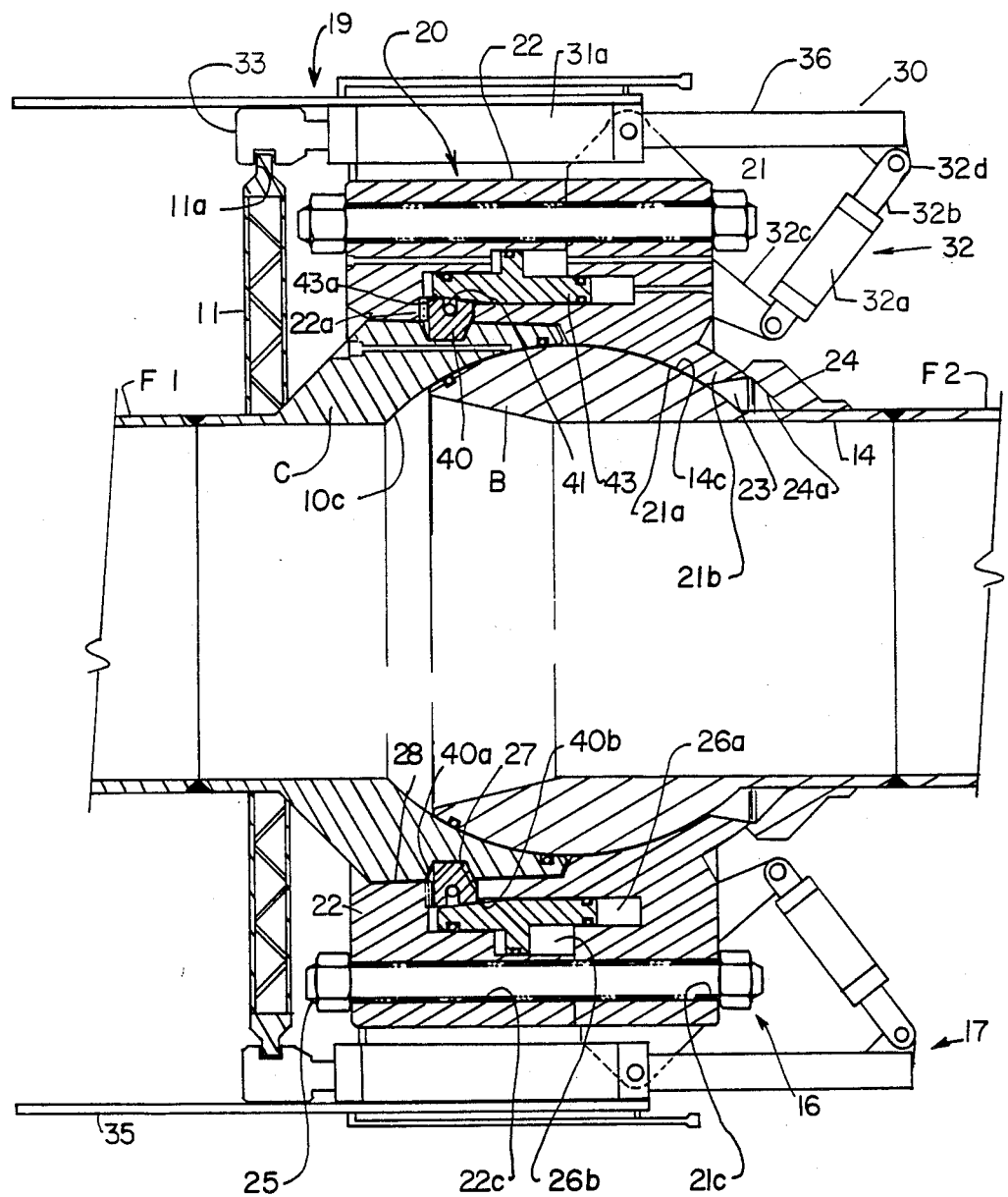
FIG. 2 is a sectional view similar to FIG. 1A with the male and female members in a final, locked engagement.

The second hydraulic cylinder assembly 32 includes a hydraulic cylinder 32a and rod 32b which terminates in a piston mounted for sealable movement within the cylinder 32a in a known manner. The cylinder 32a is mounted for pivotal movement with respect to the hydraulic flange assembly body member 21 by a support 32c extending from the body member 21. The piston rod 32b is attached to a rearwardly extending arm 36, which is attached to the end of the hydraulic cylinder 31a of the first hydraulic cylinder assembly 31. The attachment between the rearwardly extending arm 36 and the second hydraulic cylinder assembly rod 32b is pivotal on attachment 32d. In this manner, movement of the hydraulic cylinder assembly 32 to a retracted position pivots the first hydraulic cylinder assembly radially outwardly to the guide position of FIG. 1A. Conversely, expansion of the second hydraulic cylinder assembly 32 moves the first hydraulic cylinder assembly 31 inwardly to the positions of FIGS. 1B and 2. When the second hydraulic cylinder assembly 32 is fully expanded, the first hydraulic cylinder assembly is pivoted radially inwardly sufficiently that the attachment or gripping head 33 including the internally facing attachment slot 33a mounts over the attachment rim 11a of the attachment disc 11 thereby attaching the hydraulic flange assembly 16 to the cup C. When the extending rod 31d and attachment head 33 of the first hydraulic cylinder assembly 31 is attached to the attachment disc 11 mounted on the cup C, the rod is still in an extended position. The hydraulic cylinder assembly 31 may then be actuated by the application of hydraulic fluid into its front section to push the rod 31d toward a contracted or retracted position thereby pulling the hydraulic flange assembly 16 and the ball B attached thereto toward the cup C. As the male member B is moved toward the female member C, the spherical external portion of the male member is moved into a position of final alignment within the female member C. The transition from the position of FIG. 1A to the position of initial alignment in FIG. 1B to the position of final alignment in FIG. 2 is disclosed in those illustrations.

After the first hydraulic cylinder assemblies 31 of the guide arm assemblies have moved the male member B into the female member C, the male member B and the female member C may then be locked together.

Final locking means, which has been generally designated by the number 20, is provided with the hydraulic flange assembly 16 for movement radially inwardly into engagement with the cup C for finally locking together the male member B and the female member C. The final locking means 20 includes a plurality of locking segments designated collectively as 40 which are circumferentially spaced around and in the circular slot 27 formed by the body members 20 and 21. Each of the locking segments 40 includes a tongue or guide portion 40a which is mounted within a groove 22a in the side of the body member 22 which forms the slot 27. In this manner, the radial locking segments 40 are mounted for radial movement inwardly and outwardly.

The plurality of circumferentially spaced locking segments 40 are held in a radially yieldable position by means of a circular spring 41 which fits in an outer, circular groove in each of the locking segments. The purpose of the spring 40 is to hold the radial locking segments in a radially inwardly extending position such that the locking segments protrude inwardly beyond the internal cylindrical receiving surface previously defined as 28. The locking segments 40 are held in the slot 27 by a tang 40b which extends over the inside surface of body member 21 which forms part of bore 26a. However, because the locking segments 40 protrude radially inwardly from the surface 28, the locking segments must yield radially outwardly as the front or camming end 10d of the female member C moves into the receiving area R. This is accomplished by the inclined leading edge or conical rim 10d of the female member C engaging the edge of the locking segments 40 as the male member B is moved into the female member. The locking segments 40 are cammed radially outwardly such that the locking segments ride upon the outer cylindrical surface 10e of the female member C and finally then are urged into the cylindrical locking groove 10f when the male and female members are in the finally aligned position of FIG. 2.

Referring to FIG. 2, the final locking means or latching assembly 20 further includes a piston 43 which is generally cylindrical in configuration and is mounted for slidable sealable movement within the bore portions 26a and 26b formed by the body members 21 and 22. The piston 43 is generally cylindrical in configuration and includes a main portion mounted within the bore portion 26a and an upper, secondary piston portion mounted within the bore portion 26b. Suitable grooves and o-rings are provided on the proper and necessary surfaces of the piston 43 to provide for slidable, sealable movement. The forward, inner end 43a of the piston 43 is radially outwardly inclined to engage against a radially inwardly inclined upper surface of the plurality of latching segments 40 to engage and move the latching segments into a final, radially inward latched and locked position as illustrated in FIG. 2. The radial thickness of the latching segments is sized such that there is an interference fit between the outer surface of the latching segments 40 and the front inner surface 43a of the piston 43 to hold the piston in its engaged position against the locking segments. In this manner, the male and female members are finally connected together.

OPERATION AND USE

While the device A of this invention has been specifically designed for the purposes of diverless connection at extended subsea depths, the device may actually be used anywhere it is desirable to make a hydraulically actuatable connection. The operation and application of the apparatus A of this invention will be described with respect to making a repair of a pipeline located on the bottom of the ocean floor. When a repair pipeline is necessary, such as for example, after a blowout or damage has occurred to a pipeline, it is first necessary to remove the damaged section. Then, a replacement spool is made up on the deck of the ship. The replacement spool may have a pipe length compensator mounted as part of the spool so that the final length of the spool may be adjusted. The apparatus of this invention may be mounted on one or both ends of the spool. For the purposes of this explanation, final installation will only be described on one end. The replacement spool is lowered down to the bottom of the ocean utilizing the ROV as remotely operable from the deck of the ship. The spool is then placed between the two ends of the flowline to be repaired. In the context of the earlier designations given to members, one end of the flowline to be repaired may be F-1 and the replacement spool itself is F-2. The cup C has already been mounted onto the flowline F-1. After the repair spool F-2 is in place with the ball end B and hydraulic flange assembly 16 adjacent to the cup C, the hydraulic cylinder assemblies 32 are retracted such that the hydraulic cylinder assemblies 31 are expanded outwardly to the position of FIG. 1A and, then the hydraulic cylinder assemblies 31 are expanded such that the rods 31d extend outwardly as illustrated in FIG. 1A. The hydraulic power is supplied from connection to the ROV. The ROV is then operated to move and center the male member B and assembly 16 generally in alignment with the female member C. The ROV then moves and adjusts the replacement spool F-2 and the apparatus A connected therewith until the extended rods 31d of the hydraulic cylinder assemblies are positioned such that the attachment heads 33 on the rods 31d are positioned over the attachment rim 11a of the member 11 attached to the female member C. The hydraulic cylinder assemblies 32 are then expanded to thereby pivot the first hydraulic cylinder assemblies 31 radially inwardly and move the attachment heads 33 over the rim 11a. In this manner, the apparatus is initially connected together and the male member B and the female member C are now initially connected together and in a position of initial alignment.

Referring to FIG. 1B, the hydraulic cylinder assemblies 31 are then actuated by applying hydraulic fluid under pressure to the left side of the cylinders 31 to move the extended rods 31d to a contracted position and at the same time thereby pulling the entire assembly 16 including the ball B inwardly into the interior of the female member C. The contraction of the hydraulic cylinder assemblies 31a causes the leading camming edge 10d of the female member C to be moved into the receiving area R formed between the hydraulic cylinder assembly bodies 21 and 22 and the exterior spherical surface 14c of the male member B. As the leading edge, which is the camming edge, 10d of the cup C moves into the receiving area R, the leading edge cams against the radial lock segments 40 and moves the radial lock segments up into the groove 27 and into the area of the first bore 26a such that the front end of the female member C can be positioned in the receiving area R. The spring 41 holds the radial locking segments and urges them radially inwardly so that, upon alignment of the cylindrical groove 10f in the cup C with the latching elements 40, the latching elements are urged radially inwardly into the groove 10f. Then hydraulic pressure is applied within the bores 26a and 26b to push the locking piston 23 forwardly against the outer surface of the radially locking segments 40 until the radial locking segments are bottomed into the groove 10f and finally alignment is obtained. An interference fit between the outer surface of the radial locking segments 40 and the inner, forward surface 43a of the piston 43 causes the latch and locking mechanism to hold firmly.

The foregoing disclosure and description of the invention are illustrative and explanatory thereof, and various changes in size, shape and materials, as well as in the details of the illustrated construction may be made without departing from the spirit of the invention.

What is claimed is:

1. Apparatus for connecting together first and second flowline members comprising:
   a female member adapted to be connected to a first flowline;
   a male member adapted to be connected to a second flowline;
   said male member including a ball portion having an exterior convex configuration of a sphere;
   said female member having a cup portion which is a concave interior portion partially in the configuration of a sphere to receive said ball portion of said male member;
   one of said male or female members having an attachment member;
   the other of said male or female members having a hydraulic flange assembly mounted therewith;
   guide means mounted with said hydraulic flange assembly for guiding said hydraulic flange assembly and said other member mounted therewith into a position of initial alignment with said one member;
   said guide means further including alignment means for pulling said male and female members together and into substantially final alignment such that said ball member is positioned within said cup member;
   final locking means mounted with said hydraulic flange assembly and forming a part thereof for moving from said hydraulic flange assembly into locked engagement with said one member; and
   mount means mounting said hydraulic flange assembly on said other member for limited movement of the hydraulic flange assembly with respect to said other member to cooperate with said guide means to align said male and female members.

2. The structure as set forth in claim 1, wherein:
   said guide means including a plurality of extendable guide arms; and
   means for positioning said guide arms outwardly and extending beyond said other member on which said hydraulic flange assembly is mounted for centering said other member as it is moved toward a position of initial alignment with said one member.

3. The structure set forth in claim 2, wherein said alignment means includes:
   means for attaching said guide arms to said attachment member on said one member and for utilizing said guide arms to pull said male and female members together.

4. The structure set forth in claim 1, wherein said guide means includes:
   a plurality of guide arm assemblies mounted with said hydraulic flange assembly, said guide arm assemblies being positioned circumferentially about said hydraulic flange assembly.

5. The structure set forth in claim 4, wherein each of said guide arm assemblies includes:
   a first hydraulic cylinder assembly including an extendable rod having an attachment head thereon, said rod being movable between extended and retracted positions by the application of hydraulic power thereto;

first cylinder mount means mounting said first hydraulic cylinder onto said hydraulic flange assembly for pivotal movement with respect thereto; and said attachment heat at said rod being attachable to said attachment member on said one member.

6. The structure set forth in claim 5, including:

each of said hydraulic cylinder assemblies having a guide bar mounted therewith, said guide bar extending beyond said extendable rod.

7. The structure set forth in claim 5, wherein each of said guide arm assemblies further includes:

a second hydraulic cylinder assembly mounted with said hydraulic flange assemblies and being movable between retracted and expanded positions; and second cylinder mount means mounting said second hydraulic cylinder assembly for pivotal movement with respect to said hydraulic flange assembly and in attachment with said first hydraulic cylinder assembly for pivotal movement with respect thereto;

said second hydraulic cylinder assembly being movable to a retracted position for moving said first hydraulic cylinder assembly outwardly assembly and being movable to an expanded position for moving said first hydraulic cylinder assembly inwardly.

8. The structure set forth in claim 5, including:

said first hydraulic cylinder assembly and rod being in said extended position during initial alignment; and said male and female members are pulled together as said first hydraulic cylinder assembly and rod is moved to said retracted position.

9. The structure set forth in claim 5, including:

said first hydraulic cylinder assembly and rod being movable to said retracted position after said attachment head of said rod has engaged said attachment member on said one of said male or female members.

10. The structure set forth in claim 5, including:

said attachment head of said rod having an internal groove therein; and said attachment member on said one member having an attachment rim radially outward of said one member for receiving said attachment head.

11. The structure set forth in claim 10, including:

said attachment member including a circular rim positioned in a plane transverse to the axis of said one member.

12. The structure set forth in claim 5, wherein:

means are mounted with said hydraulic flange assembly and with said first hydraulic cylinder assembly for pivoting said first hydraulic cylinder assembly inwardly and said attachment head of said rod into engagement with said attachment member.

13. The structure set forth in claim 1, wherein said alignment means includes:

means for attaching said hydraulic flange assembly to said attachment member; and said alignment means pulling said hydraulic flange assembly and said other member together and into alignment with said one member.

14. The structure set forth in claim 1, wherein said final locking means includes:

radial lock means mounted with said hydraulic flange assembly for movement radially inwardly into locked engagement with said one of said male or female members.

15. The structure set forth in claim 1, wherein said final locking means includes:

a plurality of radial lock segments and means mounting said radial lock segments with said hydraulic flange assembly for movement radially inwardly into locking engagement with said one of said male or female members.

16. The structure set forth in claim 15, including:

said radial lock segments being positioned in a radially inward position with respect to said hydraulic flange assembly and means are mounted with said radial lock segments for holding said segments yieldably in said radially inward position;

said radial lock segments being positioned to be engaged by said one of said male or female members as said members are pulled together and to move over said one member and become seated in a groove on the exterior of said one member when said alignment means has pulled said male and female members together such that said male member is positioned within said female member.

17. The structure set forth in claim 15, where said final locking mean further includes:

an axial movable piston means mounted with said hydraulic flange assembly;

piston mount means mounted with said axially movable piston for movement axially into engagement with and radially over said lock segments to lock said lock segments radially inwardly in said groove in said one member.

18. The structure set forth in claim 16, includes:

said one member including a camming surface which aligns with and engages said yielding radial lock segments to engage said radial lock segments as said male and female members are pulled together, said radial lock segments being movable into said hydraulic flange assembly by said camming surface.

* * * * *